United States Patent [19]
Yoshida

[11] Patent Number: 4,828,354
[45] Date of Patent: May 9, 1989

[54] INFRARED FIBER

[75] Inventor: Noriyuki Yoshida, Osaka, Japan

[73] Assignee: Sumitomo Electric Industries, Ltd., Osaka, Japan

[21] Appl. No.: 93,284

[22] Filed: Sep. 4, 1987

[30] Foreign Application Priority Data

Sep. 4, 1986 [JP] Japan ................. 61-208735

[51] Int. Cl.$^4$ .............................. G02B 6/16
[52] U.S. Cl. ................. 350/96.34; 350/96.33
[58] Field of Search ............ 350/96.29-96.34

[56] References Cited

U.S. PATENT DOCUMENTS

| 4,407,561 | 10/1983 | Wysocki | 350/96.33 |
| 4,490,008 | 12/1984 | Murakami et al. | 350/96.34 |
| 4,504,298 | 3/1985 | Yokota et al. | 65/3.11 |
| 4,552,434 | 11/1985 | Murakami et al. | 350/96.30 |
| 4,583,821 | 4/1986 | Murakami et al. | 350/96.34 |

FOREIGN PATENT DOCUMENTS

| 89220 | 9/1983 | European Pat. Off. |
| 2442859 | 3/1976 | Fed. Rep. of Germany |

OTHER PUBLICATIONS

Lussier; "Guide to Ir-Transmissive Materials"; Laser Focus, Dec. 1976; vol. 12, No. 12; pp. 47-50.
Patent Abstracts of Japan, vol. 6, No. 75 (P-114) (953) May 12, 1982 and JP A-57 013 411 (Fujikura Densen K.K.) 01-23-82 Abstract.
Patent Abstracts of Japan, vol. 7, No. 195 (C-183) (1340) Aug. 25, 1983 & JP-A-58 095 625 (Nippon Denshin Denwa Kosha) 06-07-1983 Abstract.
Patent Abstracts of Japan, vol. 5, No. 175 (P-88) (847) Nov. 11, 1981 & JP-A-56 104 305 (Kogyo Gijutsuin) 08-20-1981) Abstract.

Primary Examiner—William L. Sikes
Assistant Examiner—B. Randolph Holloway
Attorney, Agent, or Firm—Sughrue, Mion, Zinn, Macpeak & Seas

[57] ABSTRACT

An optical fiber for transmission of high intensity infrared radiation comprising a core of a silver or thallium halide crystal, a first infrared transmitting layer 5 μm thick of lead or barium fluoride and an overlying highly conductive metal film whereby both waveguide and radiation modes leaking out of the core are attenuated.

11 Claims, 2 Drawing Sheets

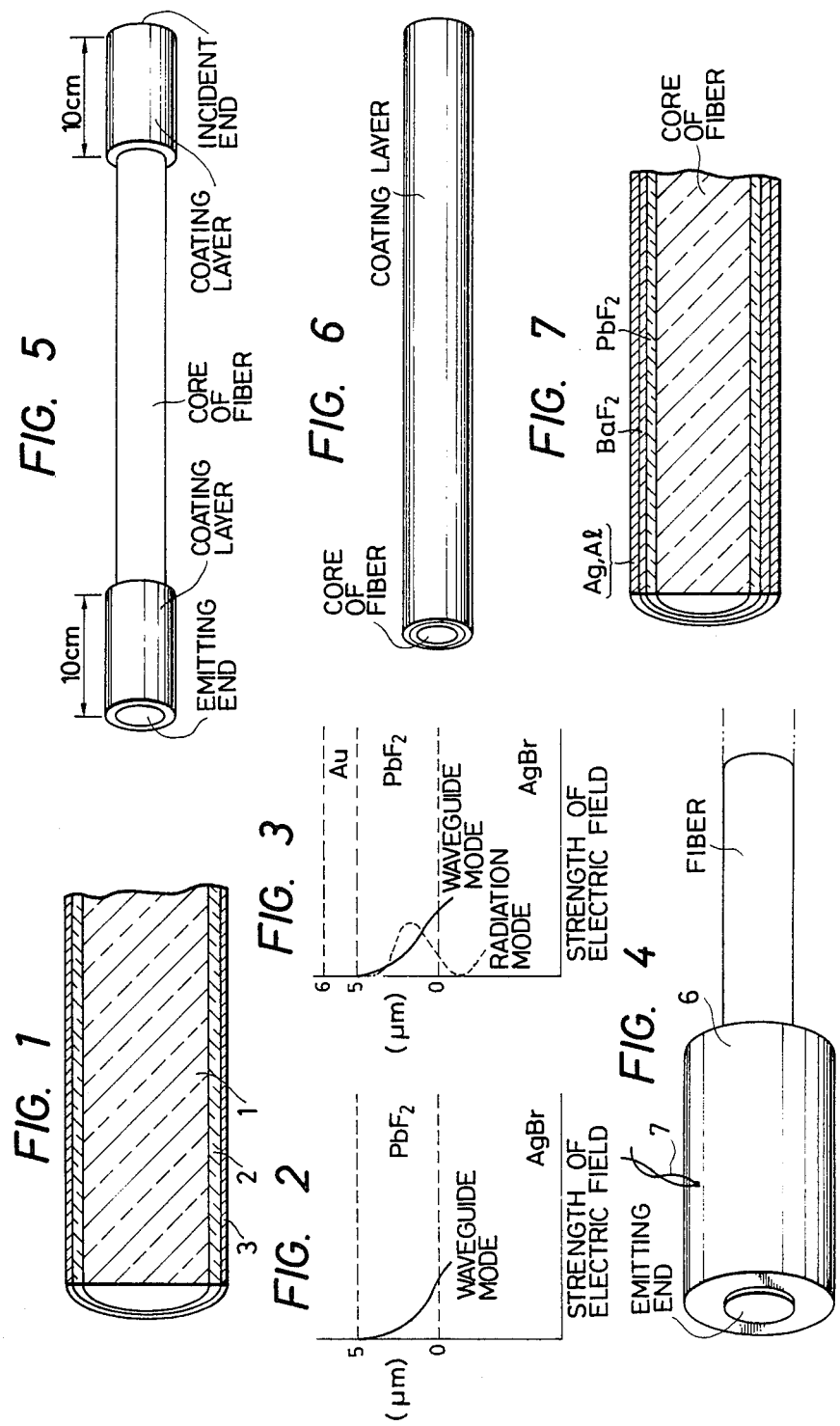

INFRARED FIBER

BACKGROUND OF THE INVENTION

1. Field of the Invention

This invention relates to an infrared optical fiber which is used for transmitting the light produced by a high output infrared laser, such as a carbon dioxide laser.

2. Background of the Invention

The light which is produced by a carbon dioxide laser has a wavelength of 10.6 μm which falls within the wavelengths of infrared radiation. Its wavelength is so long that it cannot be transmitted by a quartz glass fiber or any other type of fiber that is used for transmitting visible light or near infrared radiation.

There is hardly available any material that can effectively transmit light having such a wavelength.

Moreover, the light which is produced by a carbon dioxide laser is so powerful that if its is absorbed by an optical fiber during its transmission, it easily generates heat which damages the fiber.

A crystalline fiber formed from a metal halide (thallium, alkali or silver halide) and a glass fiber formed from chalcogenide glass are known as infrared fibers which can transmit the light produced by a high output carbon dioxide laser. These materials can transmit the light of a carbon dioxide laser with a relatively small loss. This loss is however, by far greater than the loss of visible light which occurs when it is transmitted through a quartz glass fiber.

An infrared fiber including a core formed from those materials is known which has a length of one to several meters.

While these materials are appropriate for the core of an infrared fiber, it has been very difficult to obtain an appropriate cladding material.

A quartz glass optical fiber, a multi-component glass optical fiber, and the like which are used for transmitting visible light or near infrared radiation are optical fibers of a double construction composed of a core and a cladding. The cladding is formed from a material which can transmit light and has a refractive index which is slightly lower than that of the core. The difference is refractive index between the core and the cladding determines the number of modes in which light is propagated through the core. While the cladding is required to have a refractive index which is slightly lower than that of the core, it is also required to be capable of transmitting light without absorbing it. A quartz glass fiber having such a difference in refractive index can be produced if an oxide is added to either its core or its cladding which are both formed from quartz.

A typical optical fiber has a core and a cladding. The cladding has the advantage of being capable of confining light effectively and ensuring that its propagation is free from the influence of any external factor. It is desirable to construct infrared fiber as a double structure which is composed of a core and a cladding. There has, however, not been available any infrared fiber having an appropriate cladding.

There are two reasons why no appropriate cladding has been available. In the first place, it is necessary to form a cladding from a material which has a slightly lower refractive index than that of the core and can transmit infrared radiation satisfactorily. However, no such material has hitherto been available. In the second place, it is difficult to coat the core with a cladding material.

Therefore, a crystalline infrared fiber has only a core and does not have any particular cladding. The surrounding air is its cladding. It is a fiber of the air clad construction which does not have any 'tangible' cladding. However, air can be considered as a good cladding, since it can transmit infrared radiation satisfactorily and has a refractive index which is lower than that of the core.

There is also known a resin clad chalcogenide glass fiber having a teflon cladding. This teflon cladding is, however, different from an ordinary cladding, since it does not transmit any light produced by a carbon dioxide laser.

The air clad crystalline optical fiber and the resin clad chalcogenide glass optical fiber have presented a number of problems in connection with the transmission of light from a high output carbon dioxide laser, as will hereinafter be described.

If the air clad fiber contacts an object supporting it, it fails to transmit that amount of power which it can transmit when it does not contact the supporting object. This results in a drastic reduction of the power which it can transmit since light leaks out of the fiber where it contacts the supporting object.

Any attempt to transmit a higher power of light results in the instantaneous melt down of the fiber where the fiber contacts the supporting object. As no air exists where the fiber contacts the supporting object, light is not effectively confined but leaks out. The leaking light intensely heats the supporting object. The fiber is heated so intensely that it melts.

The air clad fiber is thus unreliable insofar as it employs air as its cladding. No such problem would occur if the fiber were out of contact with any other object. The fiber must, however, be supported somewhere. The problem of heat generation by the supporting objects is, therefore, difficult to avoid wherever the fiber may be supported.

The resin clad optical fiber employing teflon, etc. for its cladding is quickly heated during its transmission of light because its cladding absorbs light. Therefore, it is very likely to melt down.

The causes of heat generation and melt down will now be discussed. An infrared fiber for a carbon dioxide laser is always exposed to the danger of melt down as the laser produces a powerful beam of light. Discussion will, therefore, be made of the possible causes of such heat generation and melt down. A study of the distribution of an electromagnetic field in the modes in which light is propagated through an infrared fiber is believed to provide an understanding of the causes.

One of the modes in which light propagates through an optical fiber is known as the wave guide mode. According to this mode, light is propagated as a result of its total reflection on a boundary surface between the core and cladding of the fiber, as shown in FIG. 8. The maximum angle θ of reflection depends on the reflective indexes of the core and the cladding.

When light is totally reflected, it is true from a standpoint of geometrical optics that no light exists in the cladding. As a matter of fact, however, an electromagnetic field also extends into the cladding, as shown in FIG. 9. FIG. 9 shows the strength of the electric field in the core and the cladding.

It is also possible that rays of light may scatter for some rason or other during its propagation through the core, as shown in FIG. 10. The scattering of light results in a change of the angle of propagation and some rays having greater angles are propagated into the cladding without being reflected on the boundary surface between the core and the cladding. FIG. 11 shows the distribution of electric field strength resulting from such scattering of light. This mode, in which light is propagated into the cladding, is known as the radiation mode. The radiation mode is always likely to occur, as some factor or other that causes the scattering of light exists in any optical fiber and also because the fiber is sometimes bent.

Thus, the electromagnetic field has a portion extending into the cladding even when light is propagated in accordance with the wave guide mode, and according to the radiation mode, some electromagnetic radiation is propagated into the cladding without being totally reflected.

The electromagnetic radiation which is propagated into the cladding area of an air clad optical fiber is absorbed by an object contacting its core to support it and having a high power of absorbing light. As a result, intense heat is generated where the core contacts the supporting object.

The electromagnetic radiation which is propagated into the cladding of a teflon clad optical fiber is also absorbed by the cladding, as teflon has a high light absorbtion. The resulting heat energy intensely heats the cladding and the core.

SUMMARY OF THE INVENTION

The foregoing discussion teaches that an optical fiber for transmitting light from a high output carbon dioxide laser must be so constructed that no electromagnetic field may exist outside the surface of the fiber.

It is, therefore, an object of this invention to provide an infrared fiber so constructed that no electromagnetic field may exist outside the surface of the fiber.

It is, therefore, an object of this invention to provide an infrared fiber so constructed that no electromagnetic field may exist outside its surface.

The infrared fiber of this invention may be summarized as an optical fiber of the triple construction which is composed of a core, a film of an infrared transmitting material and a metal film.

BRIEF DESCRIPTION OF THE DRAWINGS

FIG. 1 is a longitudinal sectional view of an optical fiber embodying this invention.

FIG. 2 is a graph showing the distribution of electromagnetic field strength in a fiber having a AgBr core coated with lead fluoride $PbF_2$.

FIG. 3 is a graph showing the distribution of electromagnetic field strength in a fiber having a AgBr core coated with lead fluoride $PbF_2$ and gold.

FIG. 4 is a perspective view of a fiber having an output end portion carrying an alumina sleeve so that its temperature elevation may be determined.

FIG. 5 is a perspective view of an optical fiber having an input and an output end portion which are both coated in accordance with this invention.

FIG. 6 is a perspective view of an optical fiber coated along its entire length in accordance with this invention.

FIG. 7 is a perspective and longitudinal sectional view of another embodiment of this invention.

DETAILED DESCRIPTION OF THE PREFERRED EMBODIMENTS

Figure 8:
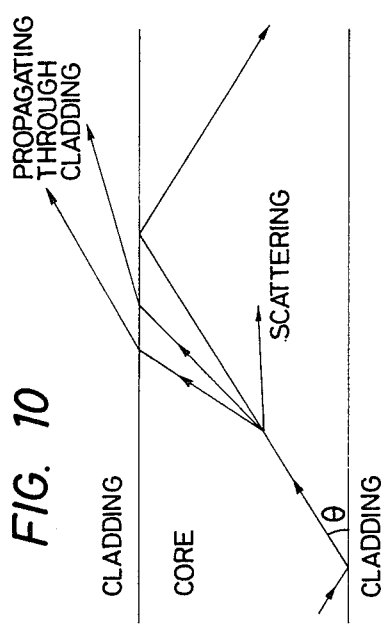
FIG. 8 is a representation based on geometrical optics of the mode in which light is propagated through a fiber.
Figure 10:
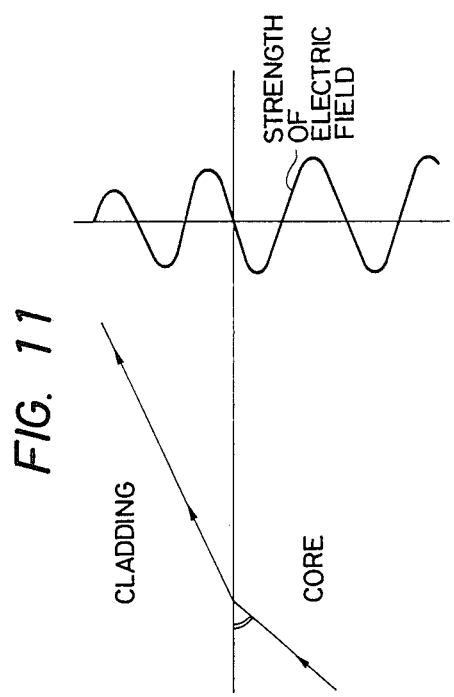
FIG. 10 is a diagram showing the scattering of light in the core.
Figure 9:
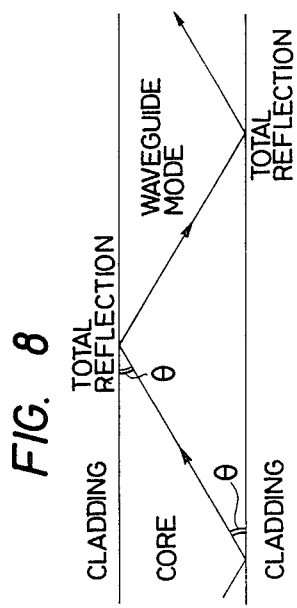
FIG. 9 is a diagram showing the strength of an electric field in the vicinity of the boundary between the core and cladding of a fiber when light is propagated according to the wave guide mode.
Figure 11:
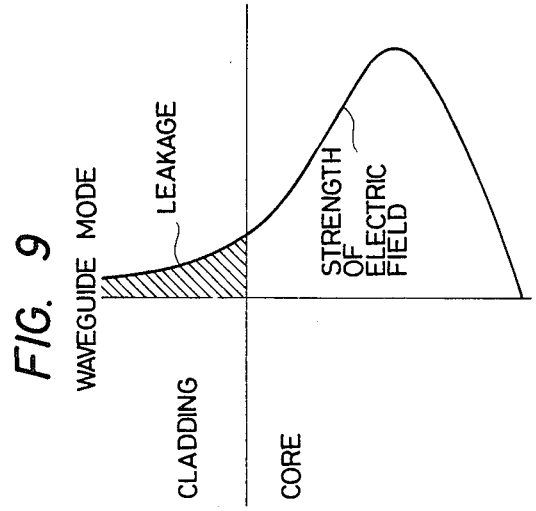
FIG. 11 is a diagram showing the strength of an electric field in the vicinity of the boundary between the core and the cladding when light is propagated according to the radiation mode.

FIG. 1 is a longitudinal sectional view of an infrared fiber embodying this invention. It comprises a core 1 formed from a crystal of silver bromide (AgBr) and an intermediate coating layer 2 of lead fluoride ($PbF_2$) surrounding the core 1. The intermediate coating layer 2 may be formed by, for example, vacuum evaporation or sputtering. It has a thickness of at least 5 $\mu$m.

An outer coating layer 3 of gold surrounds the intermediate layer 2. It has a thickness of at least 1 $\mu$m. It may be formed by, for example, vacuum evaporation or sputtering, like the lead fluoride layer.

The following is description of each of the three components.

CORE

The core 1 is formed from a crystalline or glass fiber. The crystalline fiber is formed from a silver halide crystal which is composed of AgBr, AgCl or a mixture thereof, or a thallium halide crystal which is composed of TlCl, TlI or TlBr or a mixture thereof. The glass fiber is formed from chalcogenide glass consisting mainly of Ge-S, Ge-Se, As-S or As-Se. All of these materials are known in the art of manufacture of optical fibers transmitting infrared radiation.

FILM OF AN INFRARED TRANSMITTING MATERIAL

This film 2 is a dielectric and is either a single film of barium fluoride $BaF_2$ or lead fluoride $PbF_2$, or a combination of two films of $BaF_2$ and $PbF_2$, respectively. This film must be formed from a material or materials which can transmit infrared radiation. No resin, such as teflon, can be used, as it does not transmit infrared radiation. The film preferably has a thickness of at least 5 $\mu$m.

METAL FILM

This film 3 is conductive and is formed from gold (Au), silver (Ag) or aluminum (Al), and has a thickness of at least 1 $\mu$m.

PERFORMANCE

The following is a description of how this invention performs to solve the problems which the conventional optical fibers have presented in connection with the transmission of light from a high output carbon dioxide laser, as previously pointed out. For the sake of simplicity, the description will be made with reference to the fiber construction shown in FIG. 1.

The wave guide and radiation modes are the modes of light propagation in which an electromagnetic field has a portion existing outside the core 1 of a fiber, as stated above. That portion of the electromagnetic field which extends into the cladding 2 in accordance with the wave guide mode is attenuated as it extends farther from the core 1. It has been found experimentally that when the core 1 is clad with lead fluoride, the electromagnetic field can be satisfactorily attenuated within the cladding 2 if it has a thickness of 5 μm. FIG. 2 is a graphical illustration showing what has now been stated. In FIG. 2, the abscissa or horizontal axis denotes the strength of the electromagnetic field which is produced by the wave guide mode and the ordinate or vertical axis represents the distance taken radially of the fiber. It is noted therefrom that the electromagnetic field is completely attenuated at a distance of about 5 μm from the boundary between the silver bromide (AgBr) core 1 and the $PbF_2$ cladding 2.

The optical fiber may be of either the single mode or multi-mode type depending on the radius of its core. The fibers which are used for transmitting light from a carbon dioxide laser are often of the multi-mode type, as its power is utilized in the majority of cases. A fiber of the multi-mode type may have a wide variety of waveguide modes. Whichever mode it may have, however, the electromagnetic field is attenuated in the cladding 2 with an increase of distance from the boundary between the core 1 and the cladding 2.

If only the wave guide mode is considered, it is possible to ignore the electromagnetic field outside the fiber shown in FIG. 2, as its cladding 2 has a sufficiently large thickness. It, therefore, follows that no undesirable generation of heat ought to occur even if a fiber supporting body which absorbs light may be located outside the fiber.

As a matter of fact, however, an undesirably large amount of heat is generated where the fiber contacts the supporting body if the fiber has only a cladding of $PbF_2$ as shown in FIG. 2. This generation of heat is a problem which cannot be explained if only the wave guide mode is taken into consideration. This heat generation is apparently the result of the other mode of light propagation, i.e., the radiation mode. More specifically, it is due to the leakage of radiation out of the $PbF_2$ cladding 2. The radiation mode is the mode in which the electromagnetic field has at least one vibration in the cladding. It, therefore, allows radiation to leave the cladding 2.

If a long and straight fiber having no bent portion is employed, no radiation mode ought to occur at a sufficiently large distance from a source of light. As a matter of fact, however, a short fiber or a fiber having a bent portion is often used for transmitting light from a carbon dioxide laser. Moreover, it is likely that a change of mode may occur where the fiber contacts its supporting body. Thus, the radiation mode is always likely to occur.

According to this invention, therefore, the core and cladding combination of FIG. 2 is further coated with a metal layer 3. This metal layer is, for example, formed from gold (Au). It yields a cladding of the double-layer construction and thereby a fiber of the triple construction as a whole.

FIG. 3 shows the distribution of electromagnetic field strength according to the wave guide and radiation modes in an optical fiber of the triple construction embodying this invention.

Referring to the radiation mode, there is every likelihood of radiation extending outwardly of the cladding in the fiber of FIG. 2 as hereinabove stated, but there is no leakage of light from the cladding in the fiber of FIG. 3. Light is reflected at the boundary between the lead fluoride ($PbF_2$) layer and the gold (Au) layer and is prevented from propagation outwardly of the gold layer 3. Therefore, the strength of the electromagnetic field is reduced to virtually zero at the boundary between the lead fluoride and gold layers. The gold layer is required to have a thickness of at least 1 μm to ensure the total reflection of light.

Referring now to the wave guide mode, the electromagnetic field is fully attenuated by the lead fluoride layer 2 in the fiber of FIG. 3, as in the fiber of FIG. 2, and does not reach the gold layer 3. Thus, there is no component of light leaking out of the optical fiber according to this invention, i.e., out of its gold layer 3. According to the wave guide mode, the electromagnetic field is cut off by the lead fluoride layer 1, and according to the radiation mode, it is cut off by the gold layer.

EXPERIMENTS

Experiments were conducted to verify the foregoing description. Three differently clad infrared fibers each having a core of AgBr were prepared and the leakage of electromagnetic radiation out of each fiber was determined.

The three fibers were:
(A) a fiber consisting solely of AgBr core;
(B) a fiber consisting of AgBr core and a $PbF_2$ coating covering only an outlet end portion of the core having a length of 10 cm; and
(C) a fiber consisting of a AgBr core and a $PbF_2+Au$ coating covering only an outlet end portion of the core having a length of 10 cm.

Fiber B had the construction shown in FIG. 2 and fiber C had the construction shown in FIG. 3. The coating was provided only on the outlet end portion where a particularly large amount of heat was likely to be generated. However, it is, of course, possible to coat the entire length of the core.

Three AgBr fiber cores each having a diameter of 700 μm and a length of 1 m were prepared. One of them was used as a fiber of the air clad type (fiber A). Another fiber was coated with a film of $PbF_2$ having a thickness of 5 μm, as shown in FIG. 2, and covering only a core portion having a length of 10 cm from its outlet end (fiber B). The last fiber C was coated with a 5 μm thick film of $PbF_2$ and a 1 μm thick film of gold, as shown in FIG. 3, covering only a core portion having a length of 10 cm from it outlet end, as illustrated in FIG. 5.

An alumina sleeve 6 was adhesively secured to the outlet end portion of each fiber, as shown in FIG. 4. The temperature of the sleeve 6 was measured by a thermocouple 7.

The light which was produced by a carbon dioxide laser was passed through each optical fiber, so that it might have a power of 20 W at the output end of the fiber. The surface of each fiber itself (i.e., the exposed core surface in the intermediate portion of the fiber) had a temperature of 70° C.

The temperature of the sleeve differed from one type of fiber to another. TABLE 1 shows the temperature measured for the sleeve on each fiber.

TABLE 1

Sleeve temperatures as measured when light from a carbon dioxide laser was passed through the fibers.

| Fiber | | Sleeve temperature |
|---|---|---|
| A | Air clad fiber consisting solely of a AgBr core | 180° C. to 220° C. |
| B | AgBr core + lead fluoride coating (5 μm) | 115° C. to 155° C. |

TABLE 1-continued

Sleeve temperatures as measured when light from a carbon dioxide laser was passed through the fibers.

| Fiber | | Sleeve temperature |
|---|---|---|
| C | AgBr core + lead fluoride (5 μm) + gold (1 μm) coating | 70° C. to 75° C. |
| D | AgBr core + lead fluoride (2 μm) + gold (1 μm) coating | 90° C. to 95° C. |

The following is a summary of the results of the experiments.

Referring first to the fiber embodying this invention and coated with lead fluoride and gold, as shown in FIG. 3, the sleeve at its outlet end had a temperature of 70° C. to 75° C. which did not substantially differ from the surface temperature of the fiber itself. It is therefore obvious that there was virtually no leakage of light from the fiber, whether according to the wave guide or radiation mode.

On the other hand, the sleeve on the air clad fiber consisting solely of the core had a temperature which was higher by as much as 110° C. to 150° C. than the surface temperature of the fiber itself. It is, therefore, obvious that a large amount of light leaked out of the fiber.

The sleeve on the fiber coated with only lead fluoride had a temperature which was higher by as much as 45° C. to 85° C. than the surface temperature of the fiber itself.

As regards the air clad fiber, it is apparent that light of both the wave guide and radiation modes leaked out of the fiber. As regards the fiber coated with only lead fluoride, it is apparent that light of the radiation mode leaked out.

Another fiber D having a 2 μm thick lead fluoride layer and a 1 μm thick gold layer wsa prepared to enable a study of the lower limit of the thickness which was permissible for the lead fluoride layer. The results of the experiments conducted on this fiber are also shown in TABLE 1.

The sleeve on this fiber had a temperature which was about 20° C. higher than that of the sleeve on the fiber having a lead fluoride layer thickness of 5 μm. This is apparently due to the fact that radiation of the wave guide mode leaving the surface of the AgBr core leaked out into the gold layer without being fully attenuated, and was absorbed to generate heat resulting in the higher sleeve temperature.

A fiber having a still smaller lead fluoride thickness was prepared and tested in a similar way. It was found that a reduction in thickness of the lead fluoride layer gave rise to a sharp rise in the sleeve temperature.

The results of these experiments show that the lead fluoride layer is required to have a thickness of at least 5 μm. If its thickness is less than 5 μm, the leakage of light according to the wave guide mode results in the generation of heat.

As is obvious form the foregoing, the infrared fiber of this invention can prevent the leakage of light according to the wave guide mode because a film of an infrared transmitting material surrounds its core and can additionally prevent the leakage of light according to the radiation mode because a metal film surrounds the infrared transmitting material.

Insofar as there is virtually no leakage of light therefrom, the optical fiber of this invention is not undesirably heated. Therefore, it is not damaged by even a powerful light which is produced by a carbon dioxide laser.

OTHER EXAMPLES

The experiments which have been described above were conducted on the optical fibers having coating layers 2 and 3 only on their outlet end portions.

When light from a carbon dioxide laser is transmitted through an optical fiber, it is near its outlet end that a particularly large amount of light is likely to leak out. It is, therefore, near its outlet end that the fiber is particularly likely to be heated by the light which it absorbs and therefore melt down.

The inlet end portion of the fiber is also likely to be heated, but to a smaller extent than the outlet end portion. The intermediate portion is less likely to be heated.

It was for these reasons that in the examples which have hereinabove been described, the fiber was coated with $PbF_2$ and Au only in its outlet end portion having a length of 10 cm.

This invention, however, does not preclude the coating of the inlet end portion of the fiber, as well as its outlet end portion, or the coating of the fiber along its entire length.

FIG. 5 shows by way of example an optical fiber having a 10 cm long coating layer along each of its inlet and outlet end portions. It has a coating layer not only on its output end portion, but also in its input end portion.

It has been found experimentally that a particularly large amount of light is likely to leak out of a fiber portion within a length of 10 cm from each of its input and output ends. Therefore, the provision of a double coating layer according to this invention only on each such portion yields an optical fiber which can transmit a high power of light without being easily heated or melting down.

The coating provided on only the output end portion of the fiber or each of its input and output end portions is, therefore, very effective for its length. It is, however, preferable to coat the fiber along its entire length.

FIG. 6 shows a fiber having a coating layer according to this invention along its entire length. The coating of not only its input and output end portions, but also its intermediate portion, is effective for the reasons which will hereinafter be set forth. An optical fiber is repeatedly bent when it is actually used. The repeated bending of the fiber results in an uneven or damaged core surface. These defects give rise to an increased leakage of light.

If the fiber is totally coated, however, there is no leakage of light radially outwardly of the fiber, as the light leaking out of the core is reflected back by the cladding. Therefore, it is not easily heated and does, therefore, not easily melt down. It is thus possible to obtain a highly flexible but reliable infrared fiber.

All of the fibers embodying this invention have so far been described as having a layer of lead fluoride $PbF_2$ and a layer of gold Au. This construction does, however, not limit the scope of the optical fiber coating according to this invention.

As shown in FIG. 7, a combination of a film of lead fluoride $PbF_2$ and a film of barium fluoride $BaF_2$ may be used, instead of a single layer of $PbF_2$, to form a film of an infrared transmitting material. The films of $PbF_2$ and $BaF_2$ are required to have a total thickness of at least 5 μm.

Silver (Ag), aluminum (Al), etc. may be substituted for gold to form a metal film. A layer of silver or aluminum is likewise required to have a thickness of at least 1 µm.

An optical fiber of the construction as hereinabove described is shown by way of example in FIG. 7.

Although the fiber cores have been described as being all formed from AgBr, it is not the only material that can be used for making the core of the optical fiber according to this invention. It is possible to use any other materials that are known in the art for making optical fibers for transmitting infrared radiation. Examples of those materials include:

(1) A thallium halide crystal: TlCl, TlBr, TlI or a mixture thereof;

(2) A silver halide crystal: AgBr, AgCl, AgI or a mixture thereof; and (3) Chalcogenide glass: Chalcogenide glass consisting mainly of Ge-S, Ge-Se, As-S or As-Se.

ADVANTAGES

When the optical fiber of this invention is used for transmitting light from a laser, no electromagnetic field extends outwardly of the surface of the fiber. Substantially no light leaks out. The fiber is not easily heated and does, therefore, not easily melt down.

Therefore, the optical fiber of this invention has a particularly great value as a fiber for transmitting light from a high output carbon dioxide laser.

What is claimed is:

1. An infrared fiber, comprising:
  a fiber core for transmitting infrared radiation;
  a film of an infrared transmitting material formed on the surface of said fiber core and having a thickness of at least five micrometers wherein said film of an infrared transmitting material is chosen from the group consisting of lead fluoride and barium fluoride; and
  a metal film formed on and adjacent to said film of an infrared transmitting material and having a thickness of at least one micrometer.

2. An infrared fiber as set forth in claim 1, wherein said film of an infrared transmitting material is a double layer composed of a film of lead fluoride and a film of barium fluoride.

3. An infrared fiber as set forth in claim 1, wherein said metal film is composed of a metal selected from the group consisting of gold, silver and aluminum.

4. An infrared fiber as recited in claim 1, wherein the combination of said film of said infrared transmitting material and said metal film is formed on only at least one of two ends of said fiber and not at a middle portion of said fiber between said two ends.

5. An infrared fiber as recited in claim 4, wherein said combination of said film of said infrared transmitting material and said metal is formed only on an exit end of said fiber.

6. An infrared fiber as recited in claim 4, wherein said combination of said film of said infrared transmitting material and said metal film is formed only over about 10 cm of said two ends.

7. An infrared fiber as recited in claim 5, wherein said film of said combination of said infrared transmitting material and said metal film is formed only over about 10 cm of said exit end.

8. An infrared fiber as recited in claim 1, wherein said core is formed from a silver halide crystal comprising a silver halide chosen from the group consisting of silver bromide, silver chloride, silver iodide and mixtures of said silver halides.

9. An infrared fiber as recited in claim 1, wherein said core is formed from a thallium halide crystal comprising a thallium halide chosen from the group consisting of thallium chloride, thallium bromide, thallium iodide and mixtures of said thallium halides.

10. An infrared halide as recited in claim 1, wherein said core is a glass fiber core formed from a chalcogenide glass consisting substantially of materials chosen from the group consisting of germanium-sulfur, germanium-selenium, arsenic-sulfur and arsenic-selenium.

11. An infrared fiber, comprising:
  a fiber core for transmitting infrared radiation, wherein said core is formed of a material chosen from the group consisting of a silver halide crystal, a thallium halide crystal and a chalcogenide glass;
  a film of an infrared transmitting material formed on the surface of said fiber core and having a thickness of at least five micrometers, wherein said film of an infrared transmitting material is chosen from the group consisting of lead fluoride and barium fluoride; and
  a metal film formed on and adjacent to said film and having a thickness of at least one micrometer, wherein said metal film is composed of a metal selected from the group consisting of gold, silver and aluminum.

* * * * *